3,578,629
PROCESS FOR PREPARING REINFORCED POLYOLEFINS
Robert J. McManimie, Des Peres, Mo., assignor to Monsanto Company, St. Louis, Mo.
No Drawing. Filed May 21, 1968, Ser. No. 730,896
Int. Cl. C08f 45/04, 45/14
U.S. Cl. 260—41                                    19 Claims

ABSTRACT OF THE DISCLOSURE

Process for preparing reinforced polyolefins by a Ziegler-type low pressure polymerization process comprising conducting the polymerization of a monomeric α-olefin in the presence of a filler which has been pretreated and prereacted with an organosilane of the formula $$X_a-\underset{\underset{(R_n-Z)_c}{|}}{\overset{\overset{Y_b}{|}}{Si}}$$

where X is a hydrolyzable group capable of reacting with a hydroxyl group, Y is a monovalent hydrocarbon group, R is a divalent hydrocarbon group, Z is a group containing ethylenic unsaturation, $a$ is an integer from 1 to 3, $b$ is an integer from 0 to 2, and $c$ is an integer from 1 to 3 provided that the sum of $a+b+c$ equals 4.

BACKGROUND OF THE INVENTION

The field of this invention pertains to polyolefin compositions containing inorganic filler. The field of the invention also pertains to processes for preparing polyolefin compositions.

The prior art is replete with reference describing the low pressure polymerization of polyolefins conducted in the presence of inorganic filler materials, particularly carbon black. The prior art also describes the use of various organosilanes in filled polyolefin compositions as a means for improving or modifying various properties of the composition. In such disclosures, a polyolefin such as polyethylene is masticated on mill rolls or other mixing devices with a quantity of filler and organosilane. In such instances, the filler may or may not have been pretreated with the organosilane. That is, the silane may have been added separately or it may have been added to the filler prior to addition of the filler to the polymer. Since compounding of filler and polymer is a time-consuming operation requiring the use of expensive equipment, it would be desirable if some economical means were available for preparing inorganic-reinforced polyolefin compositions. Further, conventional techniques for compounding preformed polymer and filler impose limits upon the maximum amount of filler which can be used. Beyond 50 or 60 volume percent filler, the polymer-filler mixture becomes exceedingly difficult to mix and yields brittle polymers with poorly dispersed filler. Hence, if the above sought economical means for preparing inorganic-filled polyolefins also permitted the preparation of useful compositions containing very high concentrations of filler, the proposed process would be of considerable value to those skilled in the art. Providing a process for preparing inorganic-filled, silane-coupled polyolefin compositions constitutes a principal object of this invention. Additional objects will become apparent in view of the following disclosure.

SUMMARY OF THE INVENTION

The present invention comprises a process for preparing reinforced polyolefins comprising conducting a low pressure polymerization of a mono-α-olefin in the presence of a Ziegler-type catalyst system and an inorganic filler or fiber which has been pretreated and prereacted with up to 10% by weight of the filler of an organosilane of the formula $$X_a-\underset{\underset{(R-Z)_c}{|}}{\overset{\overset{Y_b}{|}}{Si}}$$

where X is a hydrolyzable group capable of reacting with a hydroxyl group, Y is a monovalent hydrocarbon group, R is a divalent hydrocarbon group, and Z is a group containing ethylenic unsaturation, $n$ is 0 or 1, $a$ is an integer from 1 to 3, $b$ is an integer from 0 to 2, $c$ is an integer from 1 to 3, and the sum of $a+b+c$ equals 4.

DESCRIPTION OF THE PREFERRED EMBODIMENTS

The mono-α-olefins included within the scope of this invention are those olefins having a single ethylenically unsaturated carbon to carbon bond. Recent work in the art has demonstrated the applicability of low pressure polymerizations to several monomeric olefins having up to about 12 carbon atoms. However, it will become apparent from the following discussion that the benefits and unobvious features of this invention are dependent not upon the particular olefin used, but rather upon the interrelationship of catalyst, filler and organosilane coupler. Accordingly, although olefins having up to 12 carbon atoms are preferred for use herein, higher α-olefins having as many as 20 or more carbon atoms are definitely included within the scope of this invention. Examples of suitable monomers include ethylene, propylene, butene-1, pentene-1, hexene-1, heptene-1, octene-1, nonene-1, decene-1, dodecene-1, 3-methyl butene-1, 4-methyl pentene-1, 3-methyl pentene-1, 3-methyl hexene-1, 4-methyl hexene-1, 3,4-dimethyl-3, 4-methyl hexene-1, 4-butyl octene-1, 5-ethyl decene-1, 2,8-diethyl decene-1, and styrene. The above monomers can be polymerized alone to provide homopolymers or a combination with one another to yield copolymers or higher interpolymers. The above olefins can further be copolymerized with other ethylenically unsaturated monomers such as vinyl chloride, vinyl acetate, methyl methacrylate, acrylic acid and the like. The use of ethylenically unsaturated monomers other than the olefins is limited for purposes of this invention to monomer systems containing at least 50% monoolefins and preferably at least 75% monoolefins.

The Ziegler catalyst systems employed herein are exemplified by compositions having components of (a) organic compounds of metals represented by $R_yMeX_z$ in which R is hydrocarbon or hydrocarbon-$MeX_z$; Me is a I-A, II-A, III-A or IV-A metal of the Periodic Table; X is hydrogen, hydrocarbon or halogen and the sum of Y+Z is equivalent to the valence of the metal Me; and (b) a compound of a Group III-B, IV-B, V-B, VI-B, VII-B, VIII or I-B metal of the Periodic Table.

One of the conveniently employed groups of Ziegler-type catalysts is that disclosed in Belgian Pat. No. 533,362, issued May 16, 1955, to Ziegler, the disclosure of which is hereby incorporated herein by reference, namely catalysts prepared by the interaction of a trialkylaluminum with a compound of a metal of Group IV-B, V-B, or VI-B of the Periodic Table, including thorium and uranium, and especially compounds of titanium, zirconium, and chromium. These and a variety of other catalysts of the Ziegler-type can be considered exemplified by the catalysts obtained by the interaction of a trialkylaluminum with titanium tetrachloride. Other catalysts of the Ziegler-type differ from those disclosed in the above-mentioned Belgian Pat. No. 533,362, in a various ways, for example, as follows. Instead of or in addition to the aluminum trialkyls, catalysts of the type described in the Belgian patent can be made by reacting the various metal compounds of the general formula RAlX$_2$, where R is hydrogen or hydrocarbon and X can be any other substituent such as halogen, hydrogen or hydrocarbon. Examples of such compounds particularly include dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy or diaryloxy compounds, and dialkyl or diaryl aluminum alkoxy or aryloxy compounds. Particularly preferred for use in combination with alkylaluminum compounds are the titanium halides such as titanium trichloride and titaniumtetrachloride. Similarly, instead of or in addition to the organoaluminum compounds, organic compounds of magnesium or zinc can be used, and these can contain either a single or two hydrocarbon radicals, those of especial interest being Grignard compounds, magnesium dialkyls, mixed organo zinc compounds such as C$_2$H$_5$ZnI and zinc dialkyls, all of these, of course, being reacted with compounds of Groups IV–B, V–B or VI–B metals. The atomic ratio of the 1st to 3rd group metal to the IV–B to VI–B metal is ordinarily in the range of about 0.1 to 5.0, and usually in the range of about 0.1 to 1. Additional combinations of compounds useful as catalysts herein include bis(dibromoaluminum)methane plus VOCl$_3$ or VCl$_4$; bis(dichloroaluminum)methane plus tetra - n - butoxytitanium or n-butoxytitanium trichloride; and bis(dichloroaluminum)methane plus molybdenum acetyl acetonate or nickel acetyl acetonate.

The polymerization of olefins is conventionally carried out in an inert liquid hydrocarbon such as hexane, heptane, isooctane, purified kerosene, cyclohexane, methyl cyclohexane, benzene, toluene, xylene, chlorobenzene, or dichlorobenzene. Those skilled in the art will be aware of several other suitable liquid hydrocarbons which are non-reactive under the polymerization conditions. Although not essential, those liquid hydrocarbons are preferred which are capable of functioning as a solvent for the catalyst system or the polymerizable monomers.

The catalyst, diluent, silane-filler adduct and monomer can be mixed in any desired order. One preferred order of mixing the components is to add to the inert liquid first the metal salt and then the organo metallic compound of the formula R$_n$MeX$_2$, followed by the silane-filler adduct. To this mixture is then added the polymerizable olefins. A suitable alternative would be to add the silane-filler adduct to the inert liquid before adding the catalyst components. Since the mono-α-olefins useful herein often exist in the gaseous state, it is usually convenient to carry out the polymerization by bubbling the gas through the catalyst-filler-liquid mixture. The addition of olefins can be carried out either continuously or by batchwise addition of monomer. Since air and moisture interfere with the polymerization reaction, conventional techniques for excluding them from contact with the reaction mixture should be employed. Of course, when liquid mono-α-olefins are used, other suitable means for introducing the olefin to the reaction system can be employed. Suitable pressures can vary widely from 0.5 atmospheres or less to as high as 500 atmospheres or more. For purposes of convenience and economical operations, polymerizations are usually carried out at atmospheric pressure. Suitable polymerization temperatures also vary widely from as low as 0 to as much as 250° C., preferably from temperatures from about room temperature, i.e., 20° C., to about 80 or 100° C. After the polymerization reaction is complete, the catalyst composition is usually inactivated by the addition of water or an alcohol such as methanol. The polymer formed by the reaction is then separated, washed and dried to provide a granular product wherein the granular particles consist of the filler adduct coated with a coating of polyolefin.

The term *filler* as used herein refers to those non-polymerizable, discrete particles which are capable of existing and remaining in a discontinuous phase and placed in the presence of a polymer or polymerizing monomer and subjected to processing conditions necessary to shape the composite into a solid finished article. Inorganic filler materials useful herein can be selected from a wide variety of minerals, metals, metal oxides, metal salts such as metal aluminates and metal silicates, other siliceous materials and mixtures thereof. If the polymeric compositions or articles molded from the compositions are to be subjected to conditions of high moisture, the fillers should be at most sparingly soluble in water, not exceeding a solubility of about 0.25 gram per liter. If, however, the finished composition is then used in an application where moisture sensitivity is not a problem, more soluble filler materials can be used. Generally, those hard, high modulus materials which have or can acquire an alkaline surface upon treatment with a base are best suited for use in reinforced polymeric compositions and hence are preferred for inclusion in the instant process. By high modulus is meant a Young's modulus of elasticity at least twice as great as that of the unfilled polyolefin. More preferably, suitable inorganic fillers will have a Young's modulus of 10$^7$ p.s.i. or greater. Many inorganics fulfill both preferred characteristics of high modulus and alkaline surface and therefore constitute one class of preferred filler materials. Since metal silicates and siliceous materials usually have or can readily acquire the desired alkaline surface, and since they are characterized by modulus values well above the preferred minimum, a preferred mixture is one which contains a major amount, i.e. more than 50% by weight, of metal silicates or siliceous materials. Examples of inorganic fillers include various minerals such as feldspar, wollastonite, mullite, quartz, alumina, graphite, cristobalite, asbestos, calcium carbonate, spodumene, mica, talc, montmorillonite, kaolinite, bentonite, hectorite, beidellite, attapulgite, chrysolite, garnet, saponite, hercynite and kyanite. Other useful fillers include metals such as aluminum, tin, lead, magnesium, calcium, strontium, barium, titanium, zirconium, vanadium, chromium, manganese, iron, cobalt, nickel, copper and zinc; metal oxides such as oxides of the foregoing metals; heavy metal phosphates, sulfides and sulfates; and glass flakes and fibers, silica gel, carbon black, calcium carbonate, elemental boron and its oxides and many others. In addition to the inorganic materials, several solid organic materials can also be used such as sawdust, wood chips, cellulosic fibers, thermosetting resinous particles, etc. It should be recognized that suitable fillers, particularly the organic fillers, should not be soluble or otherwise adversely affected when placed in the presence of the inert liquid used in the polymerization system.

The geometric shape of the filler can vary widely from spheroidal to plate-like to fibrous. If long fibers are to be used, the size of the reaction vessel and the filler concentration will often impose some restriction on their length. That is, the fibers must be of a length which will not prevent their thorough distribution through the inert liquid medium. If the fibers are so long or the dispersed filler is so concentrated in the inert liquid medium that the fibers become entangled, the production of a good uniform polymeric product will be impaired because of polymer deposition on large fibrous agglomerates. Fibers ⅛ to ¼ inch in length are quite satisfactory for use herein. For the preparation of most polymeric compositions within the scope of this invention, a preferred maximum fiber length is about 0.5 inch. Those skilled in the art will be able to use longer fiber lengths in some special applications.

The particle size (average diameter) of granular fillers can vary widely from less than one micron up to a few millimeters. Suitable particles include those having a maximum particle size of 5 microns and an average size of one micron, a maximum of 10 microns and an average of two microns, a maximum of 44 microns and an average of 10 microns, a maximum of 250 microns and an average of 44 microns and a maximum of 1000 microns and an average of 500 microns.

The quantity of filler present in the polymerized product can be any amount. One of the advantages of this process is that compositions can be prepared having any desired concentration of filler. All that is necessary is that the filler be capable of being dispersed in the inert liquid. For this invention to provide polymeric compositions with demonstrable improvement over the unfilled resin, it is usually necessary that some minimum discrete quantity of filler be employed, e.g. sufficient filler to provide a polymeric composition having at least 1% by volume filler, preferably at least 10% by volume filler. Regarding a maximum concentration of filler, compositions can be prepared containing 99% or more filler. To provide a composition having some material advantage over unmodified filler, it will usually be necessary to limit the filler concentration to 99%, and more preferably to about 90%. Compositions having such high filler concentration are usually not used alone to prepare molded articles, but rather they can be blended with unfilled polyolefin to provide a fabricated article having an optimum filler concentration. The small amounts of polymer present in the form of a thin coat over filler particles in compositions containing 95% filler for instance, facilitates the blending of polymer and fillers by reducing the frictional characteristics of the polymer interface. For the fabrication of articles having improved mechanical properties, compositions having from about 10 or 20 to about 60% by volume are preferred. In summary, the amount of filler useful in the practice of this invention extends from that quantity required to provide a finished composition having any desired amount of filler from 1% or less up to 99% or more. Preferred filler ranges are from about 10 to about 60%, and more preferably from about 20 to 50% by volume.

Organosilanes useful herein have the formula

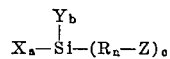

where X is a hydrolyzable group capable of reacting with a hydroxyl group, Y is a hydrogen or monovalent hydrocarbon group, R is a divalent hydrocarbon group, Z is a group containing ethylenic unsaturation, $n$ is 0 or 1, $a$ is an integer from 1 to 3, $b$ is an integer from 0 to 2, $c$ is an integer from 1 to 3, and the sum of $a+b+c$ equals 4. Examples of suitable X groups include halogen, hydroxy, alkoxy, cycloalkoxy, aryloxy, alkoxy-substituted alkoxy such as β-methoxyethoxy, alkoxycarbonyl, aryloxycarbonyl, alkylcarboxylate and arylcarboxylate groups, preferably having 8 or less carbon atoms. Examples of Y groups in the above formula are hydrogen, methyl, ethyl, vinyl, isobutyl, phenyl and other hydrocarbyl groups, preferably having 10 or less carbon atoms. The function of the Y groups can be to modify the extent of the polymer-filler bond, to regulate viscosity of the monomer slurry-filler dispersion or to modify the thermal stability of the coupler. The R group can be any divalent hydrocarbon group having up to about 20 carbon atoms and preferably from about 2 to about 18 carbon atoms. Examples include ethylene, propylene, decylene, undecylene, octadecylene, phenylene, propenylene and undecenylene. Further, the R group need not necessarily be present at all as indicated by the value of zero for the letter $n$. Usually, however, the Z group is separated from the silicon atoms by an R group having at least two carbon atoms in the linking chain. As the number of carbon atoms in the R group increases, the coupler can perform as a viscosity reducer. Further, the activity of the Z group on the R group is often modified somewhat, thereby making the coupler perform more suitably under some processing conditions. The Z group can be any functional group containing ethylenic unsaturation. Ethylenically unsaturated commercially available organosilanes usually contain vinyl groups or methacryloxy groups but other ethylenically unsaturated groups such as allyl, other olefinic groups and acryloxy groups are also suitable. Examples of suggested organosilane couplers include vinyl triethoxysilane, $CH_2{=}CHSi(OC_2H_5)_3$;
vinyl methyldichlorosilane, $CH_2{=}CHSi(CH_3)Cl_2$;
methyl β-(methyldifluorosilyl)acrylate,
 $(F)_2(CH_2)SiCH{=}CHCOOCH_3$;
2-trimethoxysilylethyl methacrylate,
 $(CH_3O)_3SiC_2H_4OOCC(CH_3){=}CH_3$;
3-triethoxysilylpropyl methacrylate,
 $(C_2H_5O)_3SiC_3H_6OOCC(CH_3){=}CH_2$;
4-trichlorosilylbutyl acrylate,
 $(Cl)_3SiC_4H_8OOCCH{=}CH_2$;
6-tricyclohexyloxysilylhexyl methacrylate,
 $(C_6H_{11}O)_3SiC_6H_{12}OOCC(CH_3){=}CH_2$;
11-trimethoxysilylundecyl methacrylate,
 $(CH_3O)_3SiC_{11}H_{22}OOC{-}C(CH_3){=}CH_2$
18-triethoxysilyloctadecyl acrylate,
 $(C_2H_5O)_3SiC_{18}H_{36}OOCCH{=}CH_2$;
18-triacetoxysilyloctadecyl acrylate,
 $(CH_3COO)_3SiC_{18}H_{36}OOCCH{=}CH_2$; and
p-(3-trimethoxysilylpropyl) styrene,
 $(CH_3O)_3SiC_3H_6C_6H_4CH{=}CH_2$.

Particularly preferred are coupling agents of the above formula where the integer $a$ is 3, $b$ is 0, $c$ is 1, X is a chloro or alkoxy group having up to about 8 carbon atoms, R is a divalent alkylene group having from about 2 to about 18 carbon atoms, Z is a methacryloxy group, i.e.

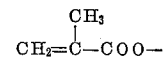

acryloxy or alkenyl group, and $n$ is 1, provided that when Z is vinyl or allyl, $n$ can be 0.

The amount of organosilane coupling agent with which the filler is treated can be relatively small. As little as one gram of coupling agent per 1000 grams of filler produces a polymeric composition with mechanical properties superior to those of a polymeric composition containing an untreated filler. Generally, quantities of coupler in the range of 1 to 40 grams per one thousand grams of filler have been found most satisfactory, although quantities of coupler as high as 10% of the filler can also be used. The quantity of coupler required for optimum mechanical properties in the filler-polyolefin composite varies depending upon the surface area of the filler and upon the particular chemical composition of the coupling agent. The examples set forth below provide specific treatment of fillers with couplers which have provided the reported degrees of success.

For the successful practice of this invention, it is essential that the filler be pretreated with the coupler in such a manner that the coupler is located on the filler surface prior to placing the filler in the polymerization reaction system. As demonstrated in the examples below, placing free coupling agent in the polymerization system together with the other additives is far less desirable than the instant method which requires that the filler be pretreated with coupler. Various means are available for pretreating the filler. Preferred means are characterized by conditions which are likely to promote reaction between the filler and coupler and to remove reaction byproducts of the filler and coupler from the mass of treated filler. For instance, the two components can be joined by combining them in the presence of a solvent or dispersant for the coupler such as water, alcohol, dioxane, benzene, etc., followed by evaporation or other means for removing the solvent or dispersant. One preferred technique is to evaporate or vacuum distill the solvent or dispersant at temperatures up to about 200° C. Alternatively, the coupler can be dry-blended with the filler. Again, the application of heat for 10 minutes or more at a temperature up to about 200° C. facilitates the joining of filler and coupler. Theoretically, it appears that the X group of the coupler reacts with hydroxyl groups on the filler surface. If a chemical reaction takes place, it could be as follows:

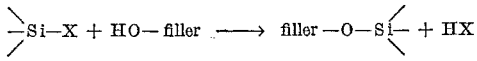

If the filler is a siliceous inorganic material, the reaction would form a very stable siloxane linkage, i.e.

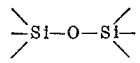

Whatever the mechanism may be, the filler must be contacted with the coupler prior to its addition to the polymerization system. And the contacting of the two components must be carried out in such a manner that the coupler is distributed over the filler surface.

One significant feature of this invention is its suitability for use in the production of crosslinked polyolefin compositions. In U.S. 3,325,442, incorporated herein by reference, a process is described for preparing crosslinked polyethylene. The teachings therein are fully applicable to this invention. And when combined with the instant process utilizing certain organosilane couplers, it is possible to produce crosslinked polyolefins having outstanding mechanical properties. One of the difficulties existing prior to, and solved by the practice of, this invention was the lack of capability to combine the benefits of U.S. 3,325,442 with the benefits achieved through the use of organosilane couplers. In employing cross-linking agents in this invention, the crosslinker is applied to the reinforced polyolefin particles without the need for milling or other mastication while at the same time avoiding premature curing of the polyolefin resin. The above features can be accomplished by adding the crosslinking agent to the polymer slurry after polymerization. Or the crosslinker can be added to the resinous particles during or after filtration, washing or some other isolation or purification step. The crosslinker should be added to the resinous particles prior to complete removal of the inert liquid medium, however, It is nevertheles possible to add the crosslinker to the dried filled polyolefin particles and obtain beneficial results. It is further possible to add the crosslinker to the polymerization reactor during polymerization. If addition of crosslinker is handled in this manner, it is often advisable to use a larger quantity of crosslinker than normally used, and to add the crosslinker shortly before termination of the polymerization, since it tends to react with the catalyst. Whatever technique for adding crosslinker is used, the isolated polyolefin powder containing filler, coupler and crosslinker can be directly molded by simply filling a mold with the powder and applying heat. In such a procedure, the powder conforms to the desired shape of the finished, molded article and there is no mechanical working either in the molding itself or prior to entering the mold to blend in the crosslinker. However, the crosslinker and fill polyethylene powder can also be molded by extrusion or injection molding procedures, provided that the temperature in the extrusion or injection step is not permitted to become too high and cause premature curing. It should be emphasized, however, that the polymerized compositions of this invention are particularly suitable for direct, powder molding procedures.

The crosslinker such as a peroxide is conveniently added to the polyolefin composition in the form of a solution in a hydrocarbon or other solvents. Suitable solvents include n-pentane, isopentane, hexane, acetone, benzene, toluene and others. Satisfactory addition of crosslinker to the polyolefin composition requires that the composition be in particulated form. Crosslinkers cannot be effectively incorporated into filed polyolefins in sheet form without extensive mechanical working.

The filled polyolefin containing crosslinking agent is conveniently molded and cured by compression molding or a similar operation. The basic procedure is to place the powdered composition in the mold cavity, close the mold and apply heat and pressure for a suitable time. The molding is generally carried out at about 260 to 450° F., often 300 to 350° F., and for a time of less than one minute to 60 minutes or more. The amount of crosslinking agent used depends upon the particular agent employed. Using peroxide curing agent, the amount will generally be less than 5% by weight of the polyolefin composition and usually from about 4.5 to about 3% by weight.

The crosslinking agents utilized herein are the "peroxides" (i.e., compounds containing 2 oxygen atoms which are singly linked). Included herein are the simple peroxides, R—O—O—R; peroxides in which the two radicals are different, R—O—O—R'; the hydroperoxides R—O—O—H, the peracids,

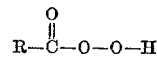

compounds of the types

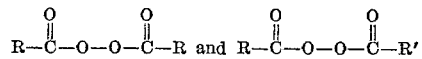

the peresters,

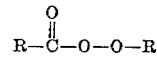

and

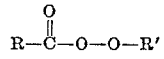

etc., where "R" and "R'" are alkyl, cycloalkyl, aryl, or arylalkyl radicals which may in turn be substituted with other substituents.

Some suitable peroxides are listed below along with their half-lives in benzene: t-butyl peroxyisobutyrate ($t^{1/2}=0.55$ hr. at 100° C.); benzoyl peroxide ($t^{1/2}=0.40$ hr. at 100° C.); p-chlorobenzoyl peroxide ($t^{1/2}=0.40$ hr. at 130° C.); t-butyl peracetate ($t^{1/2}=0.34$ hr. at 130° C.); t-butyl perbenzoate ($t^{1/2}=3.1$ hrs. at 115° C.); dicumyl peroxide ($t^{1/2}=0.28$ hr. at 145° C.); methyl ethyl ketone peroxide ($t^{1/2}=0.25$ hr. at 145° C.); di-t-butyl peroxide ($t^{1/2}=6.4$ hrs. at 130° C.); p-menthane hydroperoxide ($t^{1/2}=0.93$ hr. at 160° C.); cumene hydroperoxide ($t^{1/2}=29.0$ hrs. at 145° C.); 2,5-dimethyl-2, 5-di(t-butyl-peroxy)hexane ($t^{1/2}=2.8$ hrs. at 130° C.); 2,5-dimethyl-2,5-di-(peroxybenzoate)hexane ($t^{1/2}=1.54$ hrs. at 115° C.); benzoyl peroxide ($t^{1/2}=0.33$ hr. at 100° C.); succinic acid peroxide ($t^{1/2}=0.44$ hr. at 100° C.); etc.

EXAMPLE 1

The polymerization catalyst is prepared by adding 0.27 ml. of TiCl₄ and 0.46 ml. of diisobutyl aluminum hydride to sufficient hexane to provide 5.0 millimoles of aluminum and titanium in a 1:1 ratio per liter of hexane. The catalyst is aged for 20 minutes at 45° C. under 40 p.s.i. hydrogen and 60 p.s.i. ethylene pressure, after which time the catalyst is diluted to 25 millimoles of the aluminum/titanium mixture per liter of hexane. To a nitrogen-purged 2.5 liter reactor is added 950 ml. of hexane, 100 grams of wollastonite and 2 grams of 3-trimethoxysilylpropyl methacrylate. The reactants are stirred for 30 minutes at 45° C. after which time the TiCl₄/diisobutyl aluminum hydride catalyst prepared above is added to 50 ml. of hexane and then added to the reaction mixture with stirring. The temperature is increased to 90° C. and the reactor pressured to 20 p.s.i. with ethylene for two minutes, bled off and repressured with 40 p.s.i. hydrogen and 60 p.s.i. ethylene. After approximately 1.5 hours during which time the 100 p.s.i. pressure is maintained by adding ethylene periodically, the reaction is quenched at 400 p.s.i. by adding to the reactor 125 ml. of methanol containing 2.5 millimoles of hydroxylamine HCl. The reactor is stirred for 10 minutes, cooled to 30° C., after which time the product is removed, washed and purified. A quantity of 104 grams of material containing 100 grams of wollastonite and 4 grams of polyethylene is recovered. A control reaction utilizing no 3-trimethoxysilylpropyl methacrylate and no wollastonite produces 70 grams of polyethylene. The 4 grams produced in the instant example is considered a poor yield based upon the amount of monomer feed utilized and reaction time employed.

EXAMPLE 2

This run is carried out in an attempt to ascertain the cause for the drastic reduction in polymer yield exhibited by Example 1 in comparison to the control sample. The same procedure and ingredients used in Example 1 are used herein except that the 3-trimethoxysilylpropyl methacrylate is omitted. A reaction time of 1 hour and 40 minutes yields 69 grams of polyethylene deposited as a coating on 100 grams of wollastonite.

EXAMPLE 3

In a continuing effort to ascertain the cause for the reduction in polymer yield shown by Example 1, the procedure and ingredients used in Example 1 are repeated herein except that the wollastonite is omitted from the reaction mixture. A one hour reaction yields approximately 2 or 3 grams of polymer.

EXAMPLE 4

Example 3 is repeated except that vinyl triethoxysilane is used instead of the 3-trimethoxysilylpropylmethacrylate. About one gram of polyethylene is formed.

EXAMPLE 5

In an attempt to devise a process providing a high yield of polymer in the presence of filler and organosilane coupler, Example 1 is repeated with the following modifications. The catalyst is prepared by adding to 1 liter of hexane 100 grams of wollastonite, 4.88 ml. of diethyl aluminum chloride and 0.68 ml. of titanium tetrabutozide to provide 40 millimoles of aluminum and 2 millimoles of titanium per liter of hexane. After aging the catalyst at 25° C. for 30 minutes, the silane used in Example 1 is added to the mixture and the reactor heated to 50° C. and pressured with 60 p.s.i. hydrogen and 150 p.s.i. ethylene. A one hour reaction time produces no measurable quantity of polyethylene.

EXAMPLE 6

The procedure of Example 1 is repeated except that the quantity of catalyst used is doubled and the amount of organosilane coupler is reduced to 25% of the quantity formerly used, i.e. 0.5 gram in this run. A reaction time of one hour and 45 minutes produces 6 grams of polyethylene, a totally unsatisfactory yield.

EXAMPLE 7

The procedure of Example 1 is repeated with the two following exceptions. First, the organosilane is added to a slurry of wollastonite and methaonl, which is heated to remove the methanol, after which time the residue cake is broken up into its original powdered form and heated at 150° C. for 10 minutes. The above step makes possible the addition of both silane and filler in one step. Secondly, the catalyst amount is doubled as in Example 6 above. A two hour reaction time produces a very acceptable yield of 101 grams of polyethylene present as a coating deposited upon the wollastonite filler particles. A repeat of the above experiment produces 110 grams of polyethylene.

EXAMPLE 8

The purpose of this experiment is to ascertain whether the amount of polyethylene deposited on the filler can be controlled to provide specified proportions of polymer and filler in the finished composition. Accordingly, Example 7 above is repeated except that only 75 grams of ethylene is charged to the reactor instead of 130 grams as used in Example 7. The run produces 60 grams of polyethylene for a percent conversion roughly equivalent to that of Example 7.

EXAMPLE 9

Example 8 is repeated exactly except that no organosilane coupler is used in the formulation. The run produces 60 grams of polyethylene.

Inspection of the results reported in Examples 1 to 9 indicates that the use of a coupling agent in a low pressure polyolefin polymerization must be handled in a particular manner if worthwhile results are to be obtained. As pointed out in the specification, when compounding filler with preformed polyolefin, no noticeable difference is observed whether the organosilane is prereacted with the filler or added as a free component. Example 1 above indicates that a simple mixing of the desired components does not produce the desired product in a low pressure olefin polymerization. Example 2 indicates that the wollastonite filler is probably not the troublesome ingredient. Example 3 indicates that the organosilane coupler is the troublesome ingredient. Selection of another coupler does not remedy the situation as shown by Example 4. Nor is selection of another catalyst the key to a suitable polymerization as shown by Example 5. Increasing the catalyst concentration and reducing the amount of coupler does not result in a satisfactory yield of polymer as indicated by Example 6. Finally, in Example 7 it has been discovered that addition of the coupler to the filler before the filler is added to the polymerization system is the key to a successful polymerization. Example 8 shows that the amount of polymer deposited on the filler can be regulated to provide compositions with varying polymer concentrations. Comparison of Examples 8 and 9 shows that the silane, when prereacted with the filler, has no inhibitory effect on the polyolefin polymerization.

EXAMPLE 10

The procedure set forth in Example 7 is followed exactly except that after quenching the polymerization reaction but before removing the polymeric composition from the reactor, 40 ml. of a solution containing 0.1 gram per milliliter of dicumyl peroxide is added to the composition and the mixture stirred for 10 minutes. The composition is then washed and rinsed with alcohol in the usual manner and dried. The dried polymeric com position in granular form is then compression molded at 160° C. and 5000 p.s.i. for five minutes. The finished composition has a flexural strength and Izod impact strength greater than the corresponding properties of the composition prepared in Example 7. Flexural moduli of the two compositions are approximately equivalent.

EXAMPLE 11

The procedure reported in Example 7 is again repeated except that the catalyst concentration used in Example 1 is used for this run. A one hour and 50 minute run produces a very acceptable yield of 99 grams of polyethylene deposited on the filler, thereby demonstrating that the catalyst concentration can be varied widely without having any appreciable effect upon the polymer yield.

What is claimed is:

1. A process for preparing reinforced polyolefins comprising conducting a low pressure polymerization of a mono-alpha-olefin in the presence of a Ziegler-type catalyst system composed of
    (a) Organic compounds of metals represented by the formula RyMeXz in which R is hydrocarbon or hydrocarbon-MeXz, Me is a I–A, II–A, III–A or IV–A Group metal of the Periodic System, X is hydrogen, hydrocarbon or halogen and the sum of Y plus Z is equivalent to the valence of the metal Me, and
    (b) a compound of a Group III–B, IV–B, V–B, VI–B, VII–B, VIII–B or I–B metal, and an inorganic filler or fiber which has been pretreated with up to about 10% by weight of the filler of an organosilane of the formula

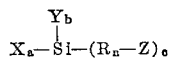

where X is a hydrolyzable group capable of reacting with a hydroxyl group, Y is a monovalent hydrocarbon group, R is a divalent hydrocarbon group, and Z is a group containing ethylenic unsaturation, $n$ is 0 or 1, $a$ is an integer from 1 to 3, $b$ is an integer from 0 to 2, $c$ is an integer from 1 to 3, and the sum of $a+b+c$ equals 4.

2. A process according to claim 1 wherein said Ziegler-type catalyst system is an alkylaluminum compound in combination with a compound of the formula $TiCl_n$ where $n$ is 3 or 4.

3. A process according to claim 1 wherein said Ziegler-type catalyst system is diisobutyl aluminum hydride and titanium tetrachloride.

4. A process according to claim 1 wherein said mono-alpha-olefin is ethylene or propylene.

5. A process according to claim 1 wherein said mono-alpha-olefin is ethylene.

6. A process according to claim 1 wherein said filler has a maximum water solubility of 0.25 gram per liter.

7. A process according to claim 1 wherein said filler is present in sufficient quantity to provide a finished composition containing from about 10 to about 60% by volume filler.

8. A process according to claim 1 wherein said filler is present in sufficient quantity to provide a finished composition containing from about 20 to about 50% by volume filler.

9. A process according to claim 1 wherein said organosilane has the following formula

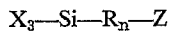

where X is a chloro or alkoxy group having up to about 8 carbon atoms, R is a divalent alkylene group and Z is a methacryloxy, acryloxy or alkenyl group, and $n$ is 1, provided that when Z is vinyl, $n$ can be 0.

10. A process according to claim 9 wherein said organo silane is a vinyl trialkoxy silane.

11. A process according to claim 9 wherein said organo silane is an omega-trialkoxysilylalkyl methacrylate.

12. A process according to claim 1 wherein the pretreating of said filler with said organosilane comprises subjecting a mixture of said filler and said organosilane to conditions which are likely to remove reaction by-products of said filler and said organosilane from the mass of treated filler, and after substantially all solvents or dispersing mediums for the silane have been removed from the filler.

13. A process according to claim 12 wherein said conditions comprise heating said filler after the organosilane has been added to the filler and after substantially all solvents or dispersing mediums for the silane have been removed from the filler.

14. A process according to claim 12 wherein said heating is carried out at a temperature up to about 200° C. for at least 10 minutes.

15. A process according to claim 1 wherein a crosslinking agent is present in admixture with the polymerized reaction product prior to its molding into a finished article.

16. A process according to claim 15 wherein said crosslinking agent is added to said reaction product subsequent to its complete polymerization but prior to drying of said reaction product.

17. A process according to claim 15 wherein said crosslinking agent is dicumyl peroxide.

18. A process according to claim 15 wherein said crosslinking agent is benzoyl peroxide.

19. A process according to claim 15 wherein the mixture of polymerized reaction product and crosslinking agent is molded at a temperature and pressure and for a time sufficient to mold and cure said polymerized reaction product.

References Cited

UNITED STATES PATENTS

| | | | |
|---|---|---|---|
| 2,751,369 | 6/1956 | Te Grotenhuis | 260—41 |
| 3,325,442 | 6/1967 | McManimie | 260—41 |
| 3,471,435 | 8/1969 | Miller | 260—41 |

OTHER REFERENCES

Sterman et al.: Society of Plastics Engineers, Inc. 21st Annual Technical Conference Technical Papers, vol. XI, Boston, Mass., March 1965, pages 1, 4 and 10.

ALLAN LIEBERMAN, Primary Examiner

J. H. DERRINGTON, Assistant Examiner

U.S. Cl. X.R.

260—17.4